Figure 1:
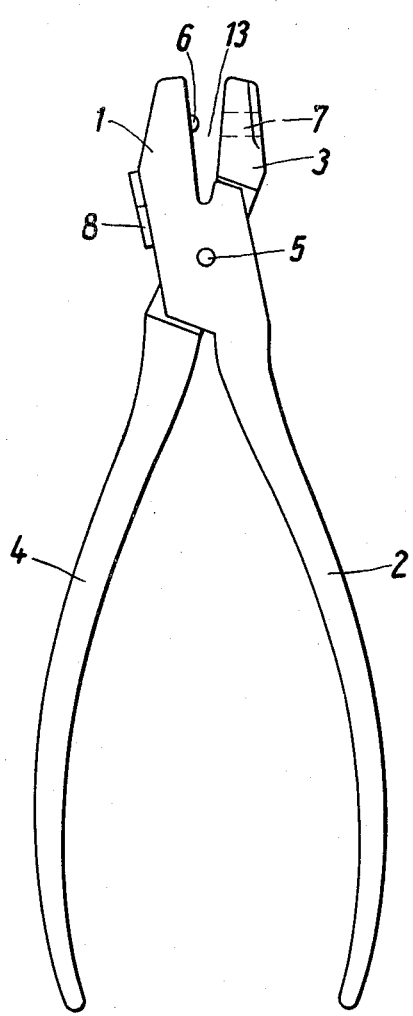

United States Patent

Koshinen

[15] 3,680,351
[45] Aug. 1, 1972

[54] PLIERS
[72] Inventor: Kauno Koshinen, Hartola, Finland
[22] Filed: Jan. 16, 1970
[21] Appl. No.: 3,289

[52] U.S. Cl. ............................................. 72/409
[51] Int. Cl. ...................................... B21d 9/08
[58] Field of Search ...72/409, 410; 29/157 T, 200 H, 29/203 H, 203 HM, 523, 432, 432.1, 512, 270; 140/106; 81/5.1

[56] References Cited

UNITED STATES PATENTS

| | | | |
|---|---|---|---|
| 1,176,793 | 3/1916 | Tuttle | 72/409 |
| 824,551 | 6/1906 | Levis | 72/409 |
| 1,910,838 | 5/1933 | Jensen | 72/409 |
| 455,253 | 6/1891 | Hummel | 72/409 |
| 604,589 | 5/1898 | Moran | 72/409 |
| 673,193 | 4/1901 | Callison et al. | 81/5.1 |
| 3,157,075 | 1/1962 | Filia | 29/200 H |
| 2,837,948 | 6/1958 | Erdmann | 81/5.1 |
| 2,761,414 | 9/1956 | Herrick | 29/522 |

FOREIGN PATENTS OR APPLICATIONS

| | | | |
|---|---|---|---|
| 325,841 | 6/1970 | Sweden | 81/5.1 |

Primary Examiner—Charles W. Lanham
Assistant Examiner—Michael J. Keenan
Attorney—Lane, Aitken, Dunner & Ziems

[57] ABSTRACT

A pair of pliers is provided which has jaws adapted for use in forming dilations in the outer surface of deformable pipes of different diameters. The dilations are formed a predetermined distance from an end of the pipe which distance varies according to the diameter of the pipe. A gauge means, convexly curved with respect to the ends of the jaws of the pliers, is fixed with respect to one of the jaws. The curved nature of the gauge permits rapid alignment of the pliers at the correct depth on pipes of different diameters.

5 Claims, 3 Drawing Figures

PATENTED AUG 1 1972 3,680,351

Inventor:
KAUNO KOSKINEN
ATTORNEYS:
Lane, Aitken, Dunner &
Ziems

PLIERS

The object of this invention is pliers, especially intended to be used in branching pipes, comprising two jaws provided with handles and turnably connected to one another by a pivot. The inner surface of one jaw is provided with a projection, knob, or the like, and the other jaw in the corresponding place with a hole or depression.

In joining branch pipes to holes made in other pipes, and especially to collar holes made in copper pipes, it is difficult to bring the branch pipe into the collar hole to the right depth and to maintain this depth and the position of the branch pipe while soldering or welding. Usually the branch pipe is positioned in the collar hole by the operator fastening it to the pipe to be branched off using clamps or similar devices, and then soldering or welding being carried out. However, fastening devices of this kind are inconvenient to use and mounting and dismounting takes a lot of time.

This invention aims to eliminate the above-mentioned disadvantages and to provide a simple implement, by means of which dilations can be made on the outer surface of the branch pipe at desired and exactly given distances from the end of the pipe. When a branch pipe provided with dilations of this kind is brought into the collar hole it goes as deep as the dilations permit, i.e. until the dilations will rest against the edge of the collar hole. Now the branch pipe stays in place on account of the dilations, so that soldering or welding can be carried out without any fastening devices whatsoever.

The above-mentioned aim is accomplished by the pliers according to the present invention, the main characteristic feature of which is that a curved plate is fixed to a jaw provided with a projection or the like. The curved plate may be fixed to the jaw's outer or inner surface. The plate has a convex side which is oriented towards the tip of the jaw and which determines the depth of the jaws, when the jaw provided with the projection is pushed into pipes of different diameter in order to make dilations in the outer surface of the pipe. Pliers of this kind have an extremely simple construction and can be used to form, easily and quickly, the above-mentioned dilations a predetermined exact distance from the end of branch pipes of different diameter. Furthermore, the same pliers can be used for pipes with very different diameter and wall thickness.

Figure 2:
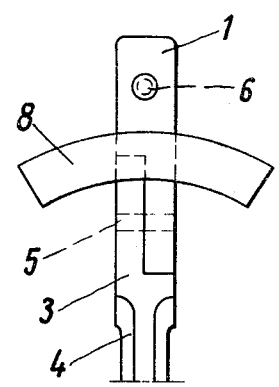
Figure 3:
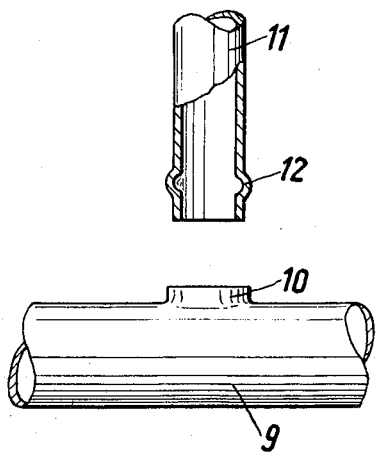

The invention is further described in the following specification and in the enclosed drawings, in which FIG. 1 is a front view of the pliers of the invention, FIG. 2 is a partial side view of the jaw end of the pliers of FIG. 1, and FIG. 3 is a view of the pipe to be branched provided with a collar hole, and the branch pipe to be fixed to it provided with dilations made with the pliers of FIGS. 1 and 2.

As shown in FIGS. 1 and 2 the pliers according to the invention comprise a jaw 1 including handle 2 and a jaw 3 including handle 4. The jaws 1 and 3 are turnably connected to one another with the aid of the pivot 5. The inner surface of the jaw 1 is rounded and provided with a knob 6 directed towards the jaw 3. The projection 6 can be made in any suitable way, for instance, it may consist of a steel ball sunk into the jaw or fastened to it. The jaw 3 is provided at a point corresponding to the projection with a hole 7 or a depression, the diameter of which is larger than that of the projection. On the outer surface of the jaw 1, i.e. on that surface which is situated on the opposite side of the projection 6, is fixed or can be fixed rigidly in some suitable way a curve-shaped regulation plate 8. The curved plate 8 naturally can also be fixed to the inner surface of the jaw, which then may be provided with a corresponding recess. The center of the curvature of the regulation plate is now situated at a suitable distance downwards from the points of the jaws, seen from the side, on the central line between the jaws and the handles, and the regulation plate is arranged so that its convex side is facing the point of the jaw 1. The plate can also be made easily detachable, in which case the pliers can be used without the curved plate.

Below the application of the pliers according to the invention is explained with reference to all figures in the drawing.

As shown in FIG. 3 the copper pipe 9 to be branched is provided with a collar hole 10, into which the branch pipe 11 can be fitted and fastened. In using the pliers the jaw 1 is pushed into the end of the branch tube 11 so far, that the end edge of the branch tube rests against the outer curve of the regulation plate 8. Thereupon jaws 1 and 3 are pressed together to form the dilation 12. In the case of a larger branch pipe the jaw 1 can be pushed deeper into the branch pipe against the regulation plate 8 curve. The dilations will locate farther away from the end of the pipes depending on the diameter in each case. This is advantageous, because the strength of the wall of large pipes is usually greater than in small pipes, so a large pipe has to be sunk deeper into the hole or collar hole 10 made in the pipe 9 to be branched off. The curvature of a regulation plate 8 of this kind may be made to suit the diameter of the branch pipe and the wall thickness in such a way, that the dilations made at the end of the branch pipe will be located at the right place in the diameter ranges usually used.

The invention naturally is not restricted to the above-presented mode of application only, but it can be varied considerably as to details within the scope of the idea of the invention. Thus, for example, the radius and shape of the curve of the regulation plate can be varied to a great extent.

I claim:

1. Pliers, for performing an operation upon pipe-like objects of different internal size, whereby one jaw of said pliers is inserted in an open end of said object, a second jaw being positioned exteriorly of said object to cooperate with said one jaw to form a dilation in said object, said pliers comprising: first and second jaws; first and second handles fixedly attached to said first and second jaws, respectively; pivot means for turnably connecting said first and second jaws; a projecting member on the interior surface of said first jaw; said second jaw defining a depression on the interior surface of said second jaw and positioned to cooperate with said projection of said first jaw; gauge means capable of being fixed relative to one of said jaws for controlling the distance between said projection and the open end of said object in which said pliers are inserted as a function of the diameter of said object.

2. The invention of claim 1 wherein said gauge means is removably fixed to said one jaw.

3. The invention of claim 1 wherein said gauge means defines a surface which is convex with respect to the tip of said one jaw, said convex surface being located upon said one jaw in a manner that the ends of said convex surface are farther from the tip of said one jaw than the central portion of said convex surface is from the tip of said one jaw.

4. The invention of claim 3 wherein said gauge means is further defined as a curved plate, whereby said curved plate controls the distance between said projection and the open end of said object in accordance with the internal size of said object.

5. The invention of claim 3 wherein said convex surface further defines a center of curvature which is located on a line, said line being midway between said jaws and said handles.

* * * * *

PO-1050
(5/69)

UNITED STATES PATENT OFFICE
CERTIFICATE OF CORRECTION

Patent No. 3,680,351          Dated  August 1, 1972

Inventor(s) KAUNO KOSKINEN

It is certified that error appears in the above-identified patent and that said Letters Patent are hereby corrected as shown below:

In the name of the inventor "Koshinen" should read --Koskinen--.

Signed and sealed this 12th day of December 1972.

(SEAL)
Attest:

EDWARD M. FLETCHER, JR.                    ROBERT GOTTSCHALK
Attesting Officer                          Commissioner of Patents